(12) United States Patent
Gaudin

(10) Patent No.: US 6,199,547 B1
(45) Date of Patent: Mar. 13, 2001

(54) HEATING APPARATUS

(75) Inventor: Jean-Marc Gaudin, Treillieres (FR)

(73) Assignee: 4E Systel, Carquefour (FR)

( * ) Notice: Subject to any disclaimer, the term of this patent is extended or adjusted under 35 U.S.C. 154(b) by 0 days.

(21) Appl. No.: 09/424,357

(22) PCT Filed: May 19, 1999

(86) PCT No.: PCT/FR98/00990

§ 371 Date: Dec. 30, 1999

§ 102(e) Date: Dec. 30, 1999

(87) PCT Pub. No.: WO98/53249

PCT Pub. Date: Nov. 26, 1998

(30) Foreign Application Priority Data

May 23, 1997 (FR) .................................................. 97 06319
May 23, 1997 (FR) .................................................. 97 06320

(51) Int. Cl.[7] .............................. F23D 14/10; F23D 14/06
(52) U.S. Cl. ....................... 126/92 B; 431/328; 126/85 A
(58) Field of Search ........................... 126/92 B, 92 AC, 126/85 A, 91 R; 431/326, 328

(56) References Cited

U.S. PATENT DOCUMENTS

| 3,330,267 | * | 7/1967 | Bauer | 126/92 B |
| 3,975,140 | * | 8/1976 | Placek | 126/92 B |
| 4,452,225 | * | 6/1984 | Plant | 126/92 B |

FOREIGN PATENT DOCUMENTS

1508280 * 1/1968 (FR) ..................................... 126/92 B

* cited by examiner

Primary Examiner—Carl D. Price
(74) Attorney, Agent, or Firm—Young & Thompson

(57) ABSTRACT

An infrared heating apparatus (1), in particular for the agricultural sector, for directional downward heating in livestock buildings, comprises at least one burner delimiting at least a conduit supplying an air/gas mixture, a reflector (3) enclosing the burner (2) and an air/gas combustion chamber (4) located at the burner conduit (2) end coaxial with the reflector (3). The burner combustion chamber (4) arranged coaxial with the reflector (3) co-operates with a solid screen (5) located beneath and in the axis of the burner conduit (2) to stop falling particles coming from the combustion and to reduce the intensity of the apparatus axial radiation thereby eliminating central overheating. The invention is useful for heating livestock buildings.

8 Claims, 2 Drawing Sheets

HEATING APPARATUS

CROSS REFERENCE OF TO RELATED APPLICATION

This is the 35 USC 371 national stage of international application PCT/FR98/00990 filed on May 19, 1998 which designated the United States of America.

FIELD OF THE INVENTION

The present invention relates to a heating apparatus of the infrared red type and is particularly applicable to heating apparatus adapted for the agricultural sector for directional heating toward the ground in livestock building.

Heating apparatus of the infrared type is now widely used. It is used for various purposes. Among numerous uses, one is the heating of livestock buildings. In the case of this use, the heating devices are used suspended in rows in said livestock buildings. The suspension height of the heating devices in this type of installation is thus a particularly important parameter. For many years, it has been sought to reduce this suspension height so as to increase the effectiveness of the heating device and to save energy. Concomitantly, the risk of fire in such installations, in particular as to the protection of particles of combustion, is widespread. This risk is increased on the one hand by the presence of plentiful dust in the atmosphere, on the other hand by the presence of dry straw on the ground.

Finally, this heating device being adapted for animal heating, it is indispensable to create regions in which the temperature is maintained fairly homogeneous and constant by avoiding the creation of any region of overheating.

None of the heating devices developed so far satisfies the above requirements in an optimum manner. A heating apparatus of the infrared type developed recently has sought, from its design, to overcome the drawbacks of the state of the art. This heating apparatus, described in the patent EP-A-0 382 286, is constituted by a reflector, a supply conduit for an air/gas mixture, a combustion chamber and a diffusion chamber, the assembly being arranged about a common axis corresponding to the axis of the supply conduit for the air/gas mixture. The choice of a reflector constituted by a reflective cap and the profile of the chambers have only led to concentrated and localized radiation of the assembly of the device in a reduced surface region located substantially below the heating device. As a result, on the ground, the heating reached a very high temperature in the region directly below the heating device whilst, when leaving this zone, the temperature rapidly drops. Because of this design connected to the conical configuration of the chambers and of the reflector in the form of a cap, it is necessary to multiply the number of heating devices to obtain heating of a large ground surface. Moreover, it is necessary in this case to be especially careful of the power regime imposed on the heating device so as to avoid reaching too high temperatures in the region in which the heat is concentrated.

Another heating device is described in Swiss patent CH-A-432.770. This heating device comprises a burner delimiting at least one conduit for supplying an air/gas mixture, a reflector surrounding the conduit, a combustion chamber for the air/gas mixture situated at the end of the conduit of the burner and coaxial to the reflector and a solid screen located below and along the axis of the burner conduit. However, this solid plate does not fulfill the function of a screen adapted to stop the fall of particles to the ground quite simply because this solid plate is lined with a cone that is perforated or not, whose conical walls extend within the combustion chamber such that the particles slide along the walls of the cone and are adapted to pass through the perforated side wall of the combustion chamber. As a result, such a heating device does not permit obtaining all the safety conditions required for the material.

Another infrared heating device is described in the patent FR-A-1.387.132. This document describes in one embodiment a heating device comprising a burner delimiting at least one supply conduit for air/gas mixture, a reflector surrounding the conduit and a combustion chamber whose surface forming the bottom is constituted by a flat screen. However, such a heating device, because of on the one hand the design of the combustion chamber, and on the other hand the design of the reflector, does not have the required heating properties.

U.S. Pat. No. 2,987,137 describes another heating device for livestock buildings whose design does not permit solving one of the problems known for such devices, namely a confinement of hot air within the volume delimited by the reflector and hence a sharp temperature rise of the walls of the reflector.

OBJECTS OF THE INVENTION

The object of the present invention is therefore to overcome the mentioned drawbacks by providing a downwardly directed heating device whose design permits enlarging the region of the projected radiant zone whilst avoiding the creation of overheated zones.

Another object of the present invention is to provide a heating device whose design permits overcoming the risks of fire by protection of particles to the ground.

Another object of the present invention is to provide a heating device whose design permits reducing the height of suspension of this device without creating overheated regions on the ground.

To this end, the invention has for its object a heating device of the infrared type, particularly adapted for the agricultural field, for directional downward heating of livestock buildings, this apparatus comprising at least one burner delimiting at least one supply conduit for a gas/air mixture, a reflector surrounding the supply conduit over at least a portion of its length and a combustion chamber for the air/gas mixture located at the end of said conduit of the burner and coaxial to the reflector and a solid screen located below and on the axis of the burner conduit, characterized in that the combustion chamber of the burner disposed coaxially to the reflector is formed by a base coaxial to the burner conduit, this base being prolonged by a perforated peripheral wall in the shape of a truncated cone whose small base is constituted by the solid screen so as, on the one hand, to stop the flow of particles emanating from combustion, and on the other hand, to reduce the intensity of axial radiation of the apparatus, thereby preventing central overheating.

Thanks to the presence of this screen shaped to receive the particles and to prevent them from reaching the ground, all risk of fire is avoided.

According to a preferred embodiment of the invention, the combustion chamber is formed by a base coaxial with the burner conduit, this base being prolonged by a peripheral perforated wall in the shape of a truncated cone whose small base is constituted by the solid screen.

BRIEF DESCRIPTION OF THE DRAWINGS

The invention will be understood from the reading of the following description of embodiments, with reference to the accompanying drawings, in which.

DETAILED DESCRIPTION OF THE INVENTION

Figure 1:
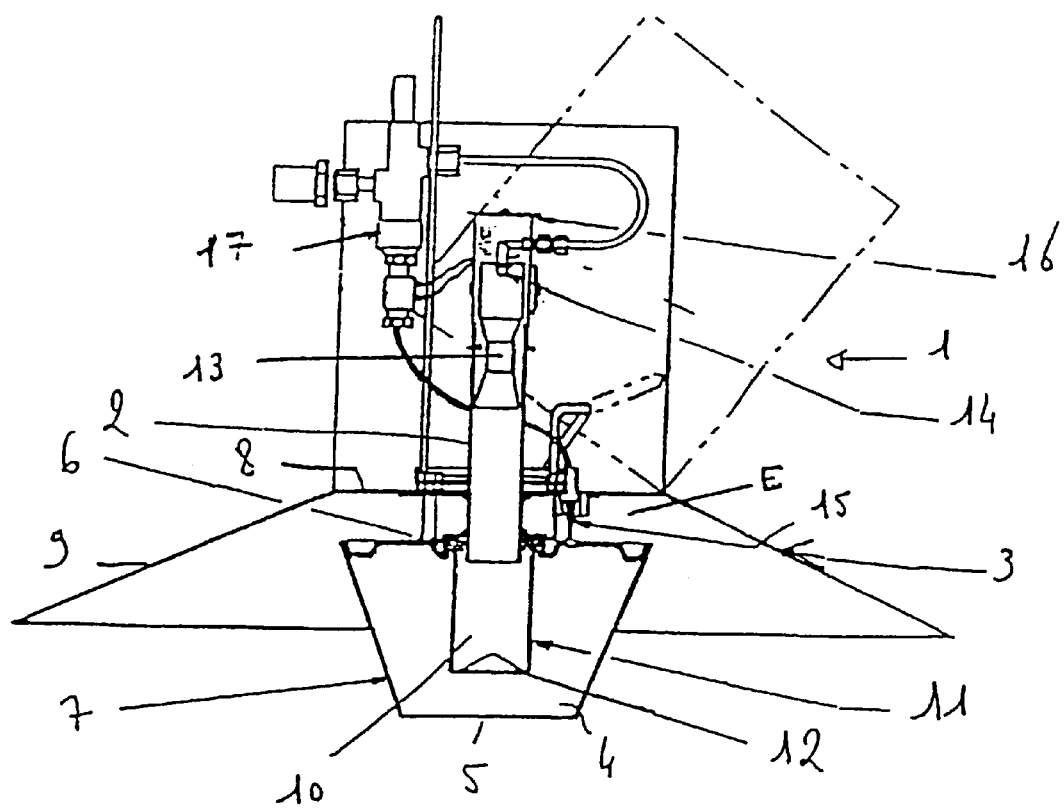
FIG. 1 is a vertical cross-sectional view of a heating apparatus according to the invention.
Figure 2:
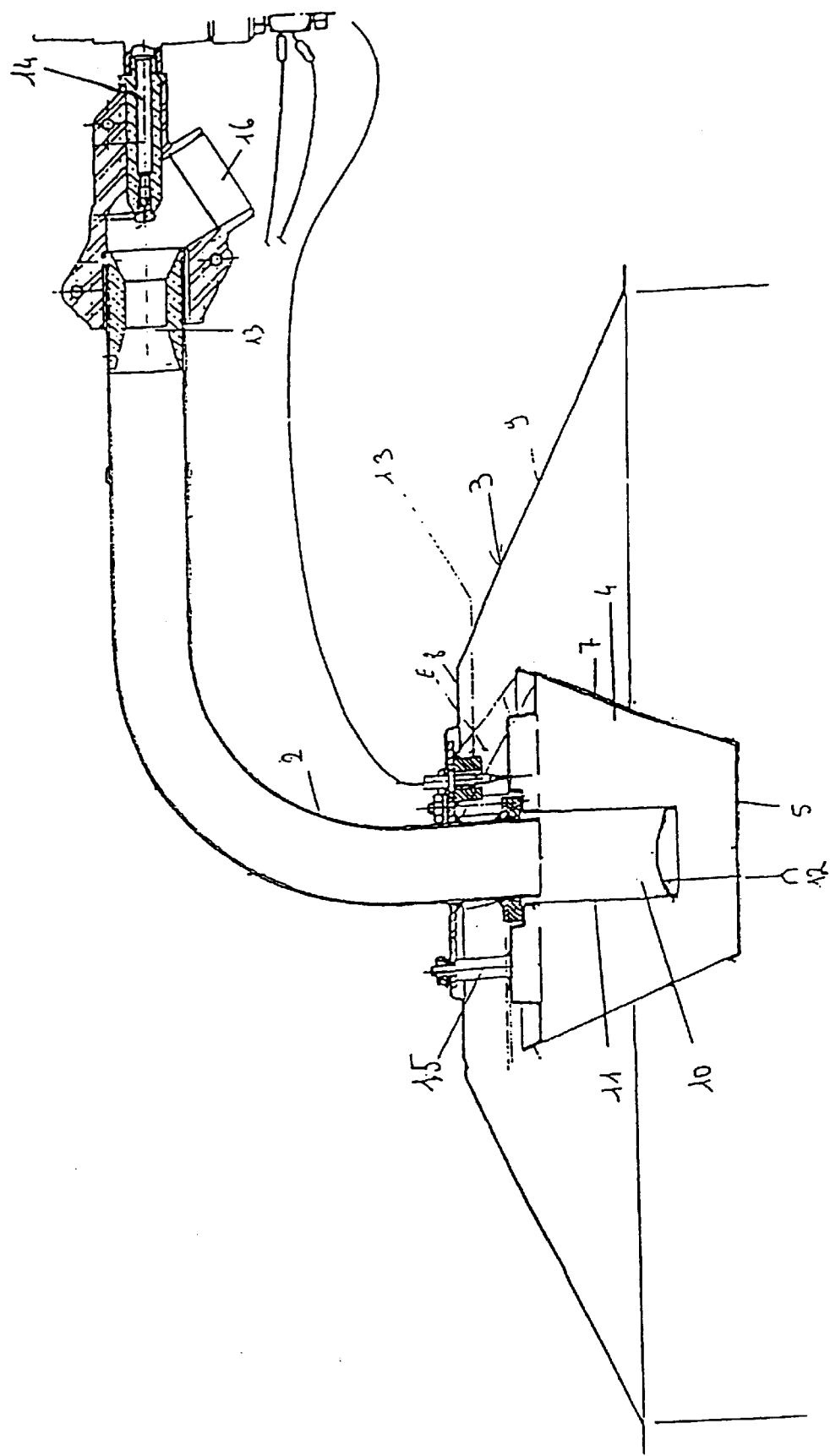
FIG. 2 is a vertical cross-sectional view of another embodiment of a heating apparatus according to the invention.

The invention is applicable to a suspended heating apparatus or device for heating downwardly. The heating apparatus or device, as shown in FIG. 1, is more particularly adapted for the agricultural field, for directional downward heating of livestock buildings. This apparatus, adapted to be supplied with gas, is connected to a source of gas by suitable connection means. Each apparatus moreover comprises a burner for a gas/air mixture. This burner is constituted by a supply conduit 2 for an air/gas mixture, a reflector 3 and a combustion chamber 4. The conduit 2 is provided in a conventional way with a Venturi element 13, with an air/gas mixing chamber, and, upstream of this latter, with an inlet mouth 16 for the primary combustion air and an injector 14. The conduit 2 of the burner generally has the shape of an elbowed pipe of which one of the branches partially penetrates the reflector 3 through a central opening provided in flat bottom 8 of this reflector 3. The second branch of the conduit 2 extends generally substantially horizontally. The horizontal branch of the conduit 2 generally carries the injector 14 and the air inlet 16. Such a shape of conduit is shown in FIG. 2. However, any other form of conduit could be envisaged, as is shown in FIG. 1. In this case, the conduit 2 of the burner is arranged about a vertical axis, the injection of gas taking place axially by means of the injector 14 within the conduit 2 as is the inlet for primary combustion air which takes place through openings 16 disposed at the upper end of said conduit 2. In the case in which the gas injector 14 is disposed axially within the conduit 2 of the burner, in the upper portion of this latter, and in which the air inlet 16 is disposed in the upper portion of the conduit 2, the air flows axially within said conduit 2 such that the air and the gas circulate within the conduit 2 of the burner along a substantially vertical path, thereby preventing any accumulation of dust contained in the air within said conduit 2. The presence of the solid screen, which will be described below, thus becomes indispensable. In the embodiment shown in FIG. 1, it will be seen that the gas injector 14 is connected by means of an injection conduit opening radially within the conduit 2 of the burner, to a safety valve 17 external to said conduit 2 of the burner, this safety valve 17 being disposed immediately adjacent the conduit 2 to reduce the swinging couple which it exerts on the burner.

In the description which follows, mention is made of the axis of the conduit 2 of the burner, this axis corresponding to the longitudinal axis of the vertical portion of the conduit 2 of the burner.

The reflector 3 is itself shaped to surround the conduit 2 of said burner. It is applied to this latter toward the so-called lower end of this conduit. Generally, this reflector 3 is secured to said conduit in a sealed manner.

The burner of the heating device also comprises a combustion chamber 4 for the air/gas mixture located at the end of the conduit 2 of the burner and coaxial to the reflector 3.

This heating device is characterized, according to the invention, by the presence of a solid screen 5 located below and along the axis of the conduit 2 of the burner. In the illustrated examples, the screen 5 is located below the mouth or outlet of the conduit 2 of the burner and constitutes at least a portion of the surface forming the bottom of the combustion chamber 4. However, this screen 5 could also be positioned outside said combustion chamber 4 below this latter. This screen 5 coacts with the combustion chamber 4 to, on the one hand, stop the fall of particles emanating from the combustion and, on the other hand, to reduce the intensity of axial radiation of the heating device, thereby preventing central overheating, this overheating having the danger of ultimately causing a fire.

The combustion chamber 4 is generally shaped with a base 6 coaxial to the conduit 2 of the burner, with the bottom constituting said solid screen 5 and with a perforated peripheral wall 7 connecting the bottom of the base 6 of said chamber. In a preferred embodiment of the invention, the combustion chamber 4 is formed with a base 6 coaxial to the conduit 2 of the burner, in particular to the vertical portion of this conduit, this base 6 being prolonged by a perforated peripheral wall 7 in the shape of a truncated cone whose small base is constituted by the solid screen 5. This solid screen 5 could be made of a refractory plate. The peripheral truncated conical wall 7 for radiation of the combustion chamber 4 is preferably flexibly secured to the base 6 of said chamber to permit its expansion at the level of its base on the periphery of the base. This peripheral wall 7 constituting a grill is preferably made of woven metal to increase the empty proportion, thereby promoting combustion within said chamber 4.

The base 6 of the combustion chamber 4 is spaced from the reflector 3 so as to create an insulating space E between base 6 and reflector 3. In the illustrated example, this base 6 is suspended from the conduit 2 of the burner by crosspieces 15 and bars. It is moreover secured sealingly to the wall delimiting the wall 2 of the burner. This base 6 is disposed in the end portion of the conduit 2 of the burner as shown in the drawings. The function of the insulating space E will be described hereinafter.

Reflector 3 is itself constituted by a bottom 8, preferably flat, prolonged from a straight inclined wall 9. This straight wall 9 is preferably perpendicular to the plane of the perforated peripheral wall 7 of the combustion chamber 4, to enlarge the projected radiant flow. Thus, it is known that the most effective radiation is that which is emitted perpendicularly to the surface which emits it. As a result, with reference to the peripheral wall 7 of the combustion chamber 4, the fact that the wall 9 of the reflector 3 is disposed substantially parallel to the radiation emitted permits the reflector 3 not to interfere with this radiation. As a result, there is maximum efficiency of heating. Moreover, this reflector is shaped such as not to cover more than 40 to 60% of the height of the combustion chamber 4.

From the three characteristics described above, there results an absence of confinement of hot air within the volume delimited by the reflector 3 and a reduction of the temperature rise of the walls of the reflector 3. This has the result that the reflector 3 is free from outlet opening of hot air and smoke. Thus, in all-the conventional heating devices, the reflector is provided with a hot air and smoke evacuation opening. This is in particular described in the patent EP-A-0 382 286 mentioned above. The presence of this hot air and smoke evacuation opening thus requires the users to have the assembly of the heating device arranged in a slightly inclined manner relative to the horizontal. Generally, this inclination is of the order of 10°. As a result, the configuration of the heating device designed for horizontal use of the heating device does not perfectly fulfill its function. Within the scope of the heating device, according to the invention, because of the absence of this hot air and smoke evacuation opening, rendered unnecessary by the configuration of the reflector and of the peripheral wall of the chamber, it results that a horizontal positioning in operation of said heating device is possible. Because of this, the configuration developed for this device is used in an optimum manner in the operational arrangement of the device.

The burner, of the so-called torch type is, as has been mentioned above, constituted by an air/gas mixing conduit opening into a combustion chamber 4. The outlet for this air/gas mixture can be provided with a conventional non-return flame grill disposed at the outlet of the conduit 2 of the burner within the combustion chamber 4. However, in a preferred embodiment of the invention, there is provided, in prolongation of the air/gas mixing conduit 2, within the combustion chamber 4, a diffusion chamber 10 of a diameter substantially equal to the diameter of the burner conduit. This diffusion chamber 10 is formed by a perforated wall 11 having a solid bottom 12, preferably of dome shape, to avoid the blocking of the chamber by the accumulation of residues. This chamber is called a diffusion chamber 10 because no combustion takes place therein. This absence of combustion is related particularly to the dimension of the perforations of the wall 11. In the illustrated examples, the diffusion chamber 10 has a generally cylindrical shape, the bottom of the cylinder corresponding to the solid bottom 12. The upper surface of this cylinder is open and communicates with the conduit 2 of the burner. The upper edge of this cylinder corresponding to the upper edge of the wall 11 is connected, preferably by covering, to the base 6 of the combustion chamber 4.

The principle of operation of such a heating device is as follows. The heating device being taken to be lit, this lighting having been carried out by means of a flame at the vicinity of the combustion chamber 4, the gas is brought by an injection conduit to the injector 14, then through the Venturi 13 and the air/gas mixture is projected into the principal combustion chamber 4, after diffusion through the diffusion chamber 10, in which the presence of the flame gives rise to its combustion. In the course of operation, the suitable heating regime is obtained by variation of the gas flow rate, this variation of gas flow rate being obtained by a variation of the pressure at the gas inlet. When turned on high, the air/gas mixture which is not ignited is projected to the outside of the diffusion chamber 10 through perforations in the wall 11 of this latter. The air/gas mixture thus projected enters into combustion between the wall 11 of the diffusion chamber 10 and the wall 7 of the combustion chamber 4. This latter is thus heated red hot over all its surface. When turned down low, the force of projection of the combustible mixture decreases. The combustion is weaker between combustion chamber 4 and the diffusion chamber 10 and approaches the wall 11 of the diffusion chamber 10. To the extent that the infrared emission of the wall 7 of the combustion chamber 4 decreases, that of the wall 11 of the diffusion chamber 10 increases. This wall 11 turns red hot thus in its turn and becomes the infrared and light emitter when turned down.

The presence of dust within the air/gas flow absolutely does not disturb the operation. Because of the dome shape of the solid surface 12 of the diffusion chamber 10, the dust has the tendency to slide along the inclined surfaces of this dome. It thus comes into contact with the peripheral wall 11 of the diffusion chamber 10. According to the operating regime, this dust is either, when turned down low, pyrolized or, in the turned-up regime of operation, brought, because of air/gas mixture flow, to rejoin the combustion chamber 4 by passing through said peripheral wall 11 through the perforations provided in this wall. The screen 5, located below this solid bottom 12 of the diffusion chamber 10, constitutes a second safety means. It prevents the burning residue falling to the ground and igniting the straw present on the ground. It also permits limiting central radiation of the combustion chamber 4, which is to say a radiation along the axis of the conduit 2 of the burner, thereby avoiding overheating the ground and the region located directly below the heating device. It thus becomes possible to lower the heating device toward the ground and thereby reduce its height of suspension, contrary to all the present heating devices which seek to concentrate the radiation within a perimeter on the ground of reduced dimension and located directly below the heating device.

Of course, such a heating device is provided with a large number of safety means and means for adjustment of the pressure of the inlet gas. However, these means will not be described because they are well known to those skilled in the art.

What is claimed is:

1. An infrared heating apparatus for downward directional heating of livestock buildings, comprising:
    at least one burner delimiting at least one supply conduit for an air/gas mixture;
    a reflector surrounding the conduit over at least a portion of the length of the conduit;
    a combustion chamber for the air/gas mixture located at an end of said conduit, and coaxial to the reflector; and
    a solid screen located below and on the axis of the conduit;
    the combustion chamber being disposed axially of the reflector and being formed by an upper base coaxial to the conduit;
    said upper base being prolonged by a perforated peripheral skirt in the form of a truncated cone having a small lower base constituted by the solid screen, which in use is structured and arranged to stop the fall of particles emanating from the combustion, and to reduce the intensity of axial radiation of the apparatus thereby to avoid central overheating.

2. The infrared heating apparatus according to claim 1, wherein the screen is constituted by a refractory plate.

3. The infrared heating apparatus according to claim 2, wherein the upper base of the combustion chamber is spaced from the reflector so as to create an insulating space between the upper base and the reflector.

4. The infrared heating apparatus according to claim 2, wherein the reflector comprises a bottom prolonged by a straight inclined wall, perpendicular to the plane of the perforated peripheral skirt of the combustion chamber.

5. The infrared heating apparatus according to claim 1, wherein the reflector covers between 40 and 60% of the height of the combustion chamber.

6. The infrared heating apparatus according to claim 1, further comprising a diffusion chamber disposed in prolongation of the supply conduit within the combustion chamber, said diffusion chamber having a diameter substantially equal to the diameter of the conduit and comprising a perforated side wall and a solid dome shaped bottom wall, to avoid blocking the diffusion chamber by accumulation of residues.

7. The infrared heating apparatus according to claim 1, wherein the gas/air mixture supply conduit comprises at least one primary combustion air inlet and encloses at least one gas injector and an air/gas mixing chamber; said supply conduit being arranged about a vertical axis; said gas injector and said air inlet being disposed in an upper portion of the supply conduit; said air emptying axially within the interior of said supply conduit such that the air and the gas circulated within the conduit of the burner along an essentially vertical path, thereby preventing any accumulation of dust contained in the air within said conduit.

8. The infrared heating apparatus according to claim 7, wherein the gas injector is connected by an injection conduit opening radially into the supply conduit of the burner to a safety valve disposed external to, and immediately adjacent the supply conduit.

* * * * *